US008652367B2

(12) United States Patent
Donnick et al.

(10) Patent No.: US 8,652,367 B2
(45) Date of Patent: Feb. 18, 2014

(54) METHOD AND APPARATUS FOR PRILLING WITH PRESSURE CONTROL (71) Applicant: Honeywell International Inc., Morristown, NJ (US)

(72) Inventors: David W. Donnick, Midlothian, VA (US); Stephanie C. Barthe, Richmond, VA (US); Gregory A. Cleotelis, Morristown, NJ (US); Andrew J. Howes, Chesterfield, VA (US); James A. Kweeder, Chesterfield, VA (US); Raymond G. Wissinger, Midlothian, VA (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 13/763,279

(22) Filed: Feb. 8, 2013

(65) Prior Publication Data
US 2013/0241093 A1 Sep. 19, 2013

Related U.S. Application Data (60) Provisional application No. 61/610,880, filed on Mar. 14, 2012.

(51) Int. Cl.
B01J 2/02 (2006.01)
(52) U.S. Cl.
USPC ................................................. 264/13; 425/7
(58) Field of Classification Search
None
See application file for complete search history.

(56) References Cited

U.S. PATENT DOCUMENTS

| 2,994,101 | A | | 8/1961 | Mullen |
| 3,055,049 | A | | 9/1962 | De Bruyne et al. |
| 3,274,642 | A | * | 9/1966 | Cramer ............................ 425/6 |
| 3,998,398 | A | | 12/1976 | Kressmann |
| 4,402,304 | A | | 9/1983 | Corey |
| 4,646,968 | A | | 3/1987 | Sablatura |
| 4,793,783 | A | | 12/1988 | Huey et al. |
| 6,689,181 | B2 | | 2/2004 | Highsmith et al. |
| 7,175,684 | B1 | | 2/2007 | Kweeder et al. |
| 7,575,365 | B2 | * | 8/2009 | Jung ............................ 366/348 |
| 2002/0182280 | A1 | | 12/2002 | Northup, Jr. et al. |

(Continued)

FOREIGN PATENT DOCUMENTS

| CN | 101766977 A | 7/2010 |
| DE | 2355660 A1 | 5/1975 |
| GB | 1266874 A | 3/1972 |
| WO | WO2009/055270 A2 | 4/2009 |

OTHER PUBLICATIONS

"Prilling—At Last" Grillo et al., InTech, Apr. 1987, v 34, n 4, pp. 51-54.

(Continued)

Primary Examiner — Mary F Theisen
(74) Attorney, Agent, or Firm — Faegre Baker Daniels LLP (57) ABSTRACT Methods and apparatus for prilling are provided which include dynamically controlling the pressure at the prill head for increased control over prill quality and size distribution. In one embodiment, the pressure of a headspace above a volume of liquid or slurry is regulated to maintain a more precise control of the pressure of the liquid or slurry at the prill head. In another embodiment, an axial upflow device is used to maintain a more precise control of the pressure of the liquid or slurry at the prill head.

19 Claims, 6 Drawing Sheets (56) References Cited

U.S. PATENT DOCUMENTS

2007/0096350 A1 5/2007 Kweeder et al.
2010/0047149 A1 2/2010 Stevens et al.
2012/0001355 A1 1/2012 Donnick

OTHER PUBLICATIONS

PCT ISR & Written Opinion issued in PCT/US2013/0028791 dated Jun. 18, 2013.

* cited by examiner

METHOD AND APPARATUS FOR PRILLING WITH PRESSURE CONTROL

CROSS-REFERENCE TO RELATED APPLICATIONS

This application claims the benefit under 35 U.S.C. §119(e) of U.S. Provisional Patent Application Ser. No. 61/610,880, filed Mar. 14, 2012, the disclosure of which is hereby incorporated by reference in its entirety.

FIELD

The present invention relates to methods and apparatus for controlling the pressure of a liquid or slurry mix during a prilling operation and, in particular, to controlling the pressure of a liquid or slurry mix in a head tank, in a prill head, or at a prill plate of a prilling tower.

BACKGROUND

Prilling refers to formation of solid particles or "prills" in an open tower via solidification as droplets fall from a prill head. Exemplary methods of prilling are disclosed in U.S. Pat. Nos. 7,175,684 and 7,575,365, the disclosures of which are incorporated by reference herein.

The quality of prills formed is dependent on several factors, including the consistency of the pressure at the prill plate. Typical methods of controlling the pressure include controlling the height of liquid or slurry in fluid communication with the prill plate. This liquid or slurry may be positioned directly above the prill plate, or may be located in a separate prill head tank in fluid communication with the prill head. In typical systems, in order to aid in maintaining a consistent supply of liquid or slurry to the prill head, a supply of the liquid or slurry to be prilled in excess of the amount required by the prill plate is provided to the prill head, and the excess liquid or slurry is returned to a supply tank located at a lower elevation.

In one typical system, feed liquid or slurry is pumped into a head tank having a weir at a predetermined height. The weir maintains the height of the liquid or slurry in the head tank, while excess liquid or slurry is discharged down the weir pipe. The excess overflows to a supply tank located at a lower elevation than the head tank.

In another typical system, a feed stream is made available to a head tank and a return stream in fluid communication with the feed stream returns excess liquid or slurry not flowing into the head tank to a supply tank located at a lower elevation. The flow of liquid or slurry from the feed stream to the head tank is regulated by a valve. The valve opens and closes in response to commands from a level indicator controller monitoring the level of liquid or slurry in the prill head tank. As liquid or slurry from the prill head tank exits through the prill head, the level indicator controller detects a drop in the tank level and adjusts the valve to allow more liquid or slurry from the feed stream to enter the tank. As more liquid or slurry enters the prill head tank, the level indicator controller detects a rise in the tank level and adjusts the valve to allow less liquid or slurry from the feed stream to enter the tank.

In still another typical system, a feed stream is provided to a prill head tank that feeds a prill head. A return stream returns excess liquid or slurry from the prill head tank to a supply tank located at a lower elevation. A valve in the return stream line opens and closes in response to commands from a level indicator controller monitoring the level of liquid or slurry in the prill head tank. As liquid or slurry from the prill head tank exits through the prill head, the level indicator controller detects a drop in the tank level and adjusts the valve to allow less liquid or slurry to exit through the return stream. If the level indicator controller detects a rise in the tank level, the controller adjusts the valve to allow more liquid or slurry to exit through the return stream.

In other typical systems, a head tank is not used and the liquid or slurry is fed directly to a vessel containing the prill plate.

Maintaining a consistent pressure at the prill plate provides a consistent quality and size distribution in the prills formed from the prilling process. However, small changes in liquid levels during operation can result in a decrease in the quality of prills produced and a wider distribution of prill sizes produced. For example, even in a large head tank, changes of only a few inches in the level of the liquid or slurry may have a profound effect on prill quality and size distribution. Maintaining fine control of the pressure is complicated by several factors. These factors include the highly viscous nature of some liquids or slurries used in the prilling process, the resolution and reaction speed of level sensors, controls, and valves associated with supplying the liquid or slurry, and variations in the pressure and flow rate associated with pumping the liquid or slurry to the top of a prilling tower.

Improvements in the foregoing processes are desired.

SUMMARY

The present disclosure provides methods and apparatus for prilling which include dynamically controlling the pressure at the prill head for increased control over prill quality and size distribution. In one embodiment, the pressure of a headspace above a volume of liquid or slurry is regulated to maintain a more precise control of the pressure of the liquid or slurry at the prill head. In another embodiment, an axial upflow device is used to maintain a more precise control of the pressure of the liquid or slurry at the prill head.

More particularly, according to the first embodiment, a pressure regulating device controls the pressure of the liquid or slurry above a prill plate by controlling the pressure of a gas or vapor in the headspace above the liquid or slurry in fluid contact with the prill plate. In one exemplary embodiment, the headspace is in a head tank of the prilling tower. In another exemplary embodiment, the headspace is in a prill head of the prilling tower. In an embodiment controlling a pressure in the headspace, headspace pressure can be precisely controlled. Precise control of headspace pressure has a direct effect on producing a more consistent pressure at the prill plate, which increases the quality of, and narrows the size distribution of, the prills produced.

In yet still another exemplary embodiment, a pressure regulating device controls the pressure of the liquid or slurry above a prill plate using an axial flow mixing element. In an embodiment using an axial flow mixing element, the amount of axial upflow can be precisely controlled. Precise control of axial upflow allows a more consistent pressure at the prill plate to be maintained, which increases the quality of, and narrows the size distribution of, the prills produced.

In one form thereof, the present disclosure provides a prilling method including the steps of supplying a liquid or slurry to a vessel in fluid communication with a prill plate having a plurality of apertures, maintaining a substantially constant volume of the liquid or slurry in the vessel while allowing passage of the liquid or slurry through the prill plate, and regulating a local pressure of the liquid or slurry at a position proximate the prill plate during the maintaining step.

In another form thereof, the present disclosure provides a prilling device for use in prilling a liquid or slurry. The prilling device includes a vessel in fluid communication with a prill plate having a plurality of apertures, a fluid inlet, and a pressure regulator for regulating a local pressure of the liquid or slurry proximate the prill plate.

The above mentioned and other features of the invention, and the manner of attaining them, will become more apparent and the invention itself will be better understood by reference to the following description of embodiments of the invention taken in conjunction with the accompanying drawings.

DETAILED DESCRIPTION

Although not so limited, the prilling process described herein is particularly useful in forming prills of fertilizer compositions, including ammonium sulfate nitrate and, in particular, a double salt of ammonium sulfate and ammonium nitrate of the type disclosed in U.S. Pat. No. 6,689,181, the disclosure of which is incorporated herein by reference. At operating conditions for a prilling process, ammonium sulfate nitrate has a high viscosity and exhibits shear thinning behavior. Shear thinning refers to the phenomena of decreasing viscosity with increasing shear rate. Not all mixtures exhibit shear-thinning and it cannot be predicted which mixtures will and which will not possess this behavior.

Figure 1:
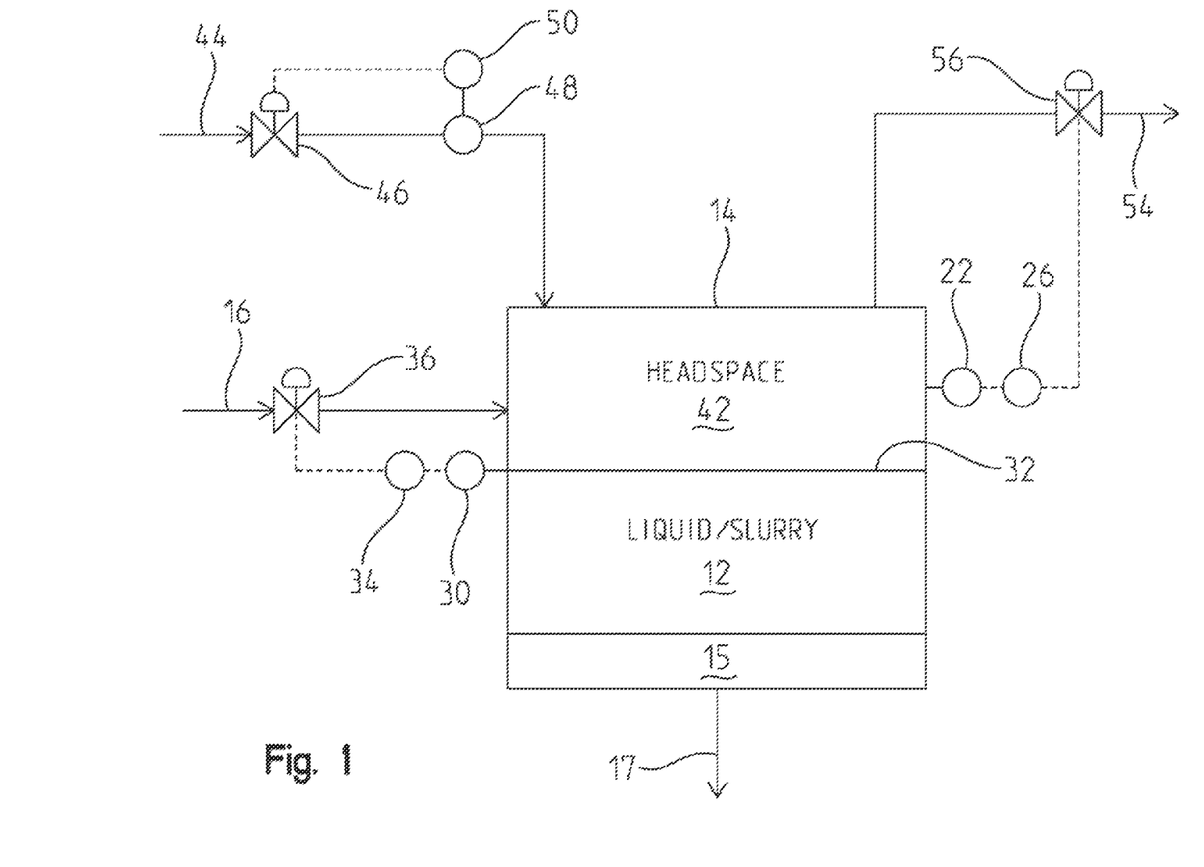
FIG. 1 illustrates an exemplary control system for controlling the pressure of a gas or vapor in a headspace above the liquid or slurry in a prilling apparatus.
Figure 2:
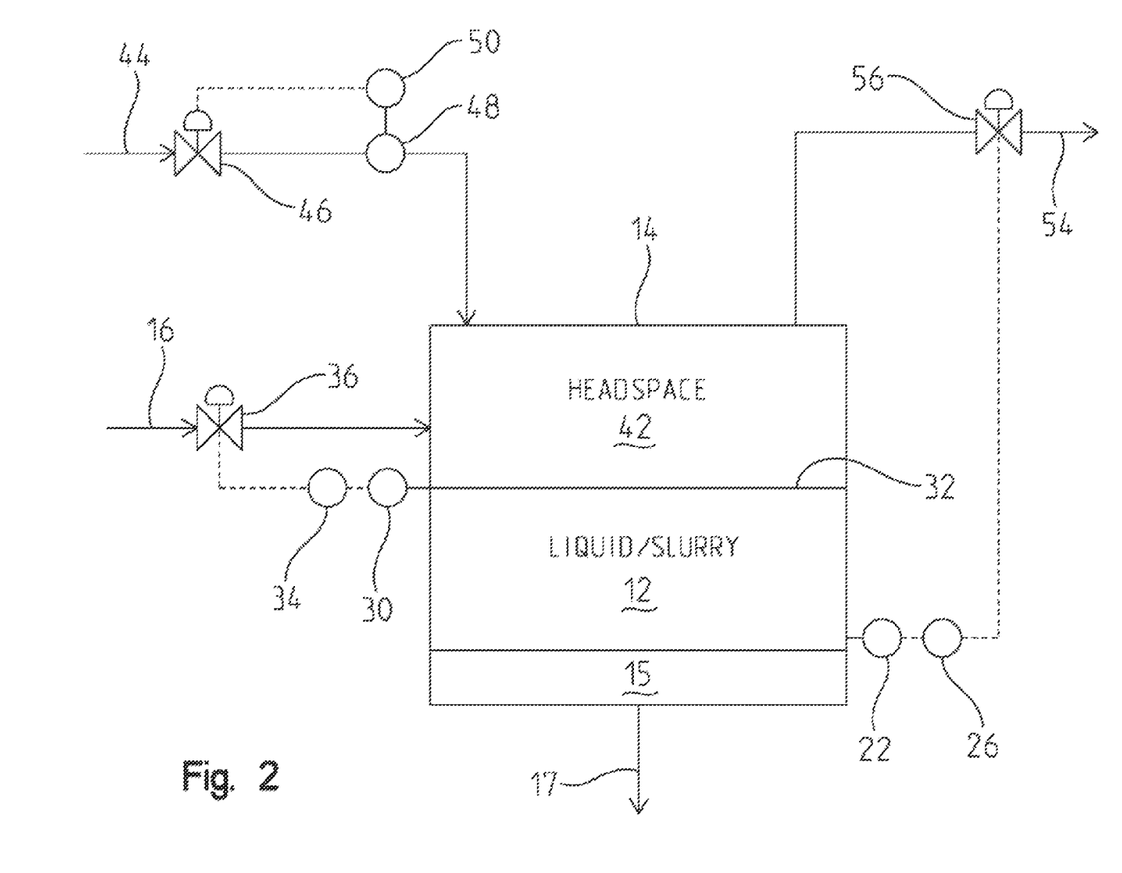
FIG. 2 illustrates another exemplary control system for controlling the pressure of a gas or vapor in a headspace above the liquid or slurry in a prilling apparatus.
Figure 3:
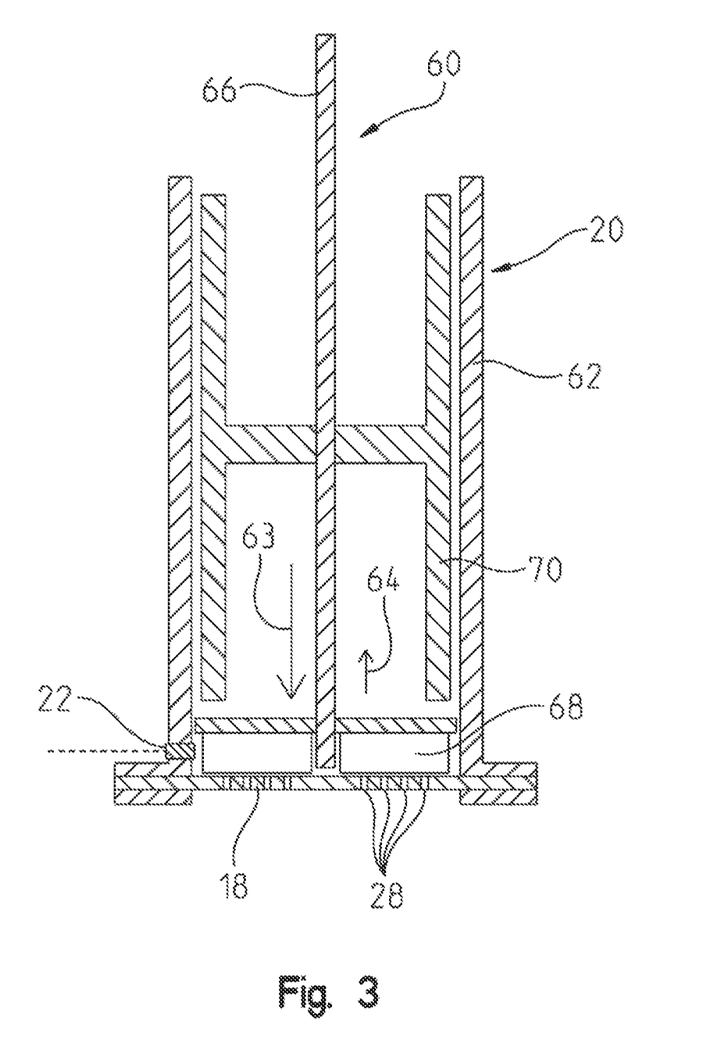
FIG. 3 shows a sectional view of a prill head including an exemplary axial mixing element.

FIGS. 1 and 2 illustrate exemplary systems for regulating the pressure of a volume of liquid or slurry 12 in a prilling process by controlling headspace pressure. FIG. 1 illustrates a vessel 14 having a bottom 15. Vessel 14 may comprise a single vessel or multiple vessels fluidly connected with each other. Vessel 14 receives a liquid or slurry from a feed stream 16 and includes an outlet 17. In one embodiment, bottom 15 of vessel 14 is itself is a prill plate comprising a plurality of prill holes as shown in FIG. 3, for example, and liquid or slurry exits vessel 14 through the prill plate to form prills. In another embodiment, bottom 15 of vessel 14 is not itself a prill plate, rather, outlet 17 is fluidly connected to a separate prill head having a prill plate, such as the prill head 20 and prill plate 18 as shown in FIG. 3, for example.

Again referring to FIG. 1, the inside of vessel 14 includes a volume of liquid or slurry 12. The top of the liquid or slurry defines the level 32 of liquid or slurry in vessel 14. If more liquid or slurry enters vessel 14 from feed stream 16 than exits through outlet 17, the volume of liquid or slurry 12 in vessel 14 will increase and level 32 will rise. If more liquid or slurry exits vessel 14 through outlet 17 than enters from feed stream 16, volume of liquid or slurry 12 in vessel 14 will decrease and level 32 will fall. In one embodiment, level 32 is monitored, and the amount of liquid or slurry entering vessel 14 from feed stream 16 is controlled to maintain level 32 at a predetermined level.

In particular, in one embodiment, level sensor 30 monitors the position of level 32 in vessel 14. Exemplary level sensors 30 include radar, microwave, acoustic, signal attenuation, nuclear, and float type sensors. Other suitable level sensors 30 may be used depending on the nature of the liquid or slurry to be prilled. Level sensor 30 outputs a signal communicating the level 32 of the volume of liquid or slurry 12 in vessel 14 to level indicator controller 34. In one embodiment, level indicator controller 34 has proportional-integral-derivative ("PID") functionality, although other suitable controllers, including but not limited to controllers with proportional, proportional-integral, proportional-derivative, and offset functionality, may also be used. Level indicator controller 34 outputs a signal to feed control valve 36 to regulate the flow of liquid or slurry through feed stream 16. If level sensor 30 detects that level 32 is falling, level indicator controller 34 further opens control valve 36 to allow more liquid or slurry to enter vessel 14. Conversely, if level sensor 30 detects that level 32 is rising, level indicator controller 34 further closes control valve 36 to allow less liquid or slurry to enter vessel 14.

When vessel 14 has an enclosed top, the interior of vessel 14 above the volume of liquid or slurry 12 defines a headspace 42. In one embodiment, gas or vapor is supplied to headspace 42 through gas or vapor feed 44. The gas or vapor supplied to vessel 14 through gas or vapor feed 44 may be any suitable material that remains in gaseous or vapor form under the range of temperatures and pressures maintained in the vessel 14 or headspace 42 during a prilling operation. Exemplary gases or vapors include but are not limited to air, nitrogen, carbon dioxide, and steam.

The flow of gas or vapor through gas or vapor feed 44 is regulated by valve 46. In one embodiment, valve 46 is a pressure reducing valve. In another embodiment, transmitter 48 transmits a measurement of gas or vapor feed 44, such as pressure or flow, to controller 50, which adjusts valve 46. In still another embodiment, valve 46 is an automatic control valve that is self adjusting based on a measurement signal transmitted by transmitter 48. Other suitable valve, transmitter, and controller arrangements for valve 46 may also be used. Gas or vapor is supplied through gas or vapor feed 44 to a pressure above a predetermined pressure for headspace 42.

Headspace 42 is fluidly connected to vent 54. In the exemplary embodiment illustrated in FIGS. 1 and 2, vent 54 is connected directly to headspace 42. In another embodiment (not shown), vent 54 is fluidly connected to headspace 42 via the vapor feed 44 between headspace 42 and valve 46.

Gas or vapor from headspace 42 exits vessel 14 through vent 54. Flow of gas or vapor through vent 54 is regulated by valve 56. In one embodiment (not shown), valve 56 is a backpressure regulator that maintains the pressure of headspace 42 at a predetermined pressure. In this embodiment, when the pressure in headspace 42 exceeds the predetermined pressure, valve 56 opens and vents gas or vapor from headspace 42 until the pressure no longer exceeds the predetermined pressure, upon which valve 56 closes. When the pressure does not exceed the predetermined pressure, valve 56 is closed.

In another embodiment, as illustrated in FIGS. 1-2, valve 56 is a control valve opening and closing in response to commands from pressure indicator controller 26 based on commands from pressure sensor 22. Pressure sensor 22 outputs a signal communicating the pressure at a position in vessel 14 to pressure indicator controller 26.

Pressure indicator controller 26 may be provided with a predetermined target pressure which may be determined by operating the prilling process at a first pressure for a given rate of liquid or slurry entering the vessel 14 through feed stream 16, a given level 32, a given temperature, and other operating parameters. Characteristics of the prills produced, such as prill quality, uniformity, and size distribution, may then be examined. The prilling process may then be operated at a second pressure and the characteristics of the prills produced compared to the characteristics of the prills produced at the first pressure. This process may be repeated until a target pressure is determined that results in acceptable or desired prill characteristics.

In one embodiment, pressure indicator controller 26 has proportional-integral-derivative ("PID") functionality, although other suitable controllers, including but not limited to controllers with proportional, proportional-integral, proportional-derivative, and offset functionality, may also be used. In another embodiment, valve 56 is a control valve receiving signals to open and close from pressure indicator controller 26 based on signals received from pressure sensor 22. In one embodiment, valve 56 is a fast-acting automatic control valve with feedback from pressure sensor 22.

In one embodiment, illustrated in FIG. 1, pressure sensor 22 is positioned to measure the pressure in headspace 42. In this embodiment, gas or vapor is supplied to headspace 42 through gas or vapor feed 44 a pressure above a predetermined pressure. Valve 56 releases gas or vapor pressure from vessel 14 through vent 54. When the pressure measured by pressure sensor 22 in headspace 42 is greater than a predetermined pressure, pressure indicator controller 26 further opens valve 56 to allow more gas or vapor to exit headspace 42 through vent 54, reducing the pressure in headspace 42. When the pressure measured by pressure sensor 22 in headspace 42 is less than a predetermined pressure, pressure indicator controller 26 further closes valve 56 to allow less gas or vapor to exit headspace 42 through vent 54, raising the pressure in headspace 42.

In another embodiment, as illustrated in FIG. 2, pressure sensor 22 is used to measure pressure of liquid or slurry in vessel or near prill plate 18 and is positioned in fluid contact with the volume of liquid or slurry 12 to be prilled at a position proximate prill plate 18, such as on the surface of the prill plate 18 or at a position on the wall of prill head 20 proximate prill plate 18. In another embodiment, pressure sensor 22 is positioned in prill head 20 for measuring the pressure of the liquid or slurry at a given position in prill head 20. In still another embodiment, pressure sensor 22 is positioned in fluid communication with a volume of liquid or slurry 12 in a prill head tank 24 in fluid connection with prill head 20. In yet still another embodiment, pressure sensor 22 is positioned in fluid communication with a volume of liquid or slurry 12 proximate prill plate 18. Pressure indicator controller 26 then controls valve 56 in response to measurements from pressure sensor 22.

In some embodiments, the pressure in vessel 14 may be more evenly maintained by controlling the pressure in headspace 42, which may improve the quality or size distribution of the prills produced.

Figure 4A:
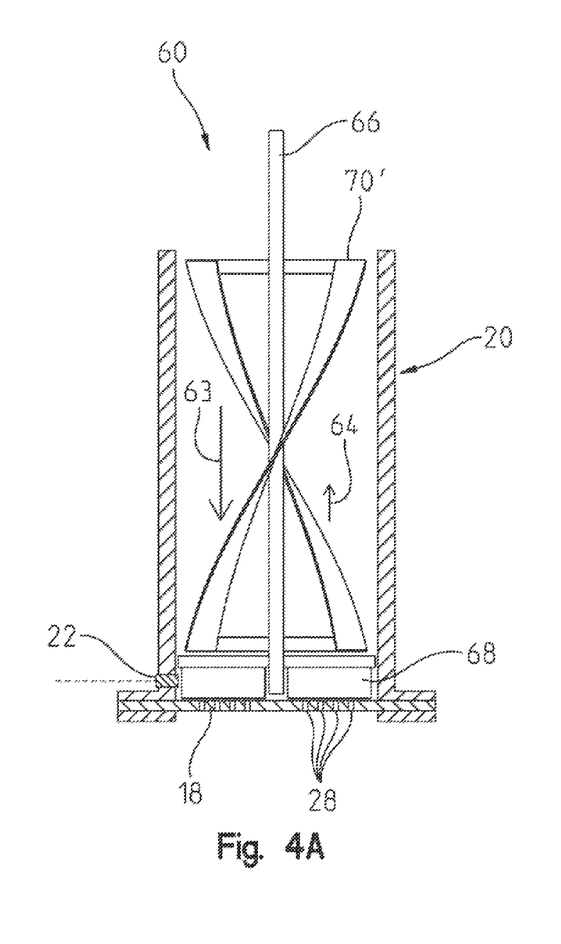
FIGS. 4A-4F illustrate prill heads including additional exemplary axial mixing elements.
Figure 4B:
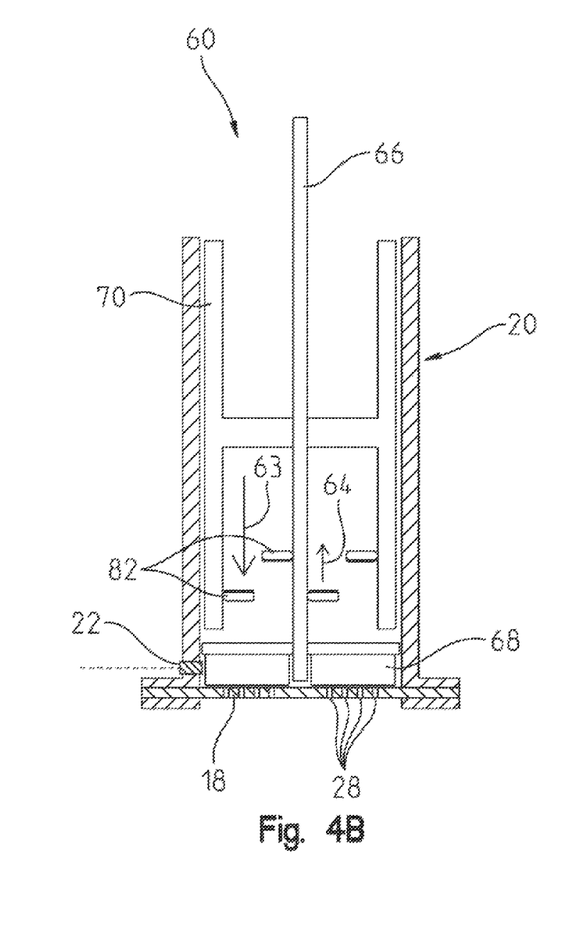
Figure 4C:
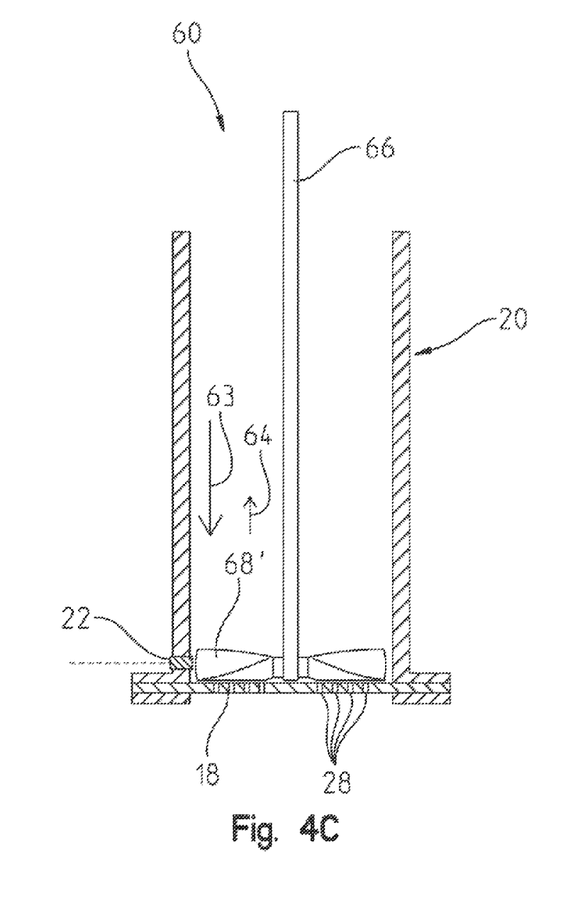
Figure 4D:
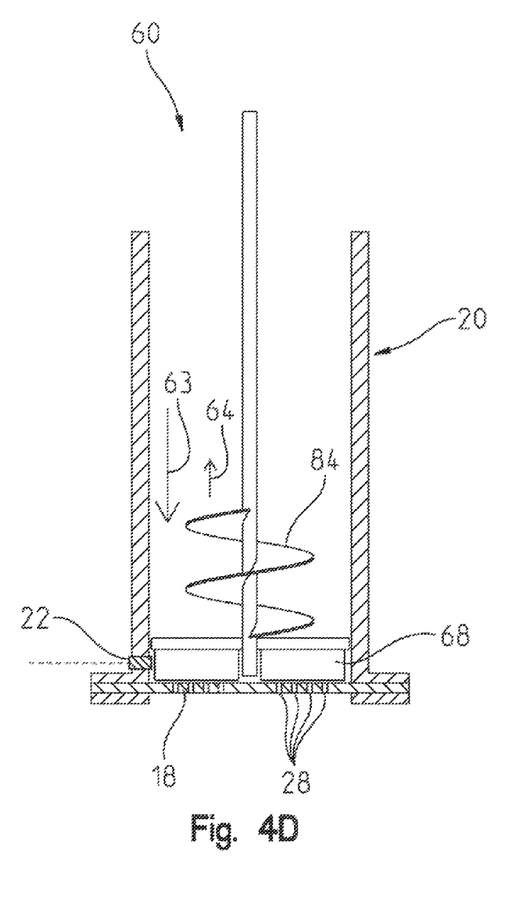
Figure 4E:
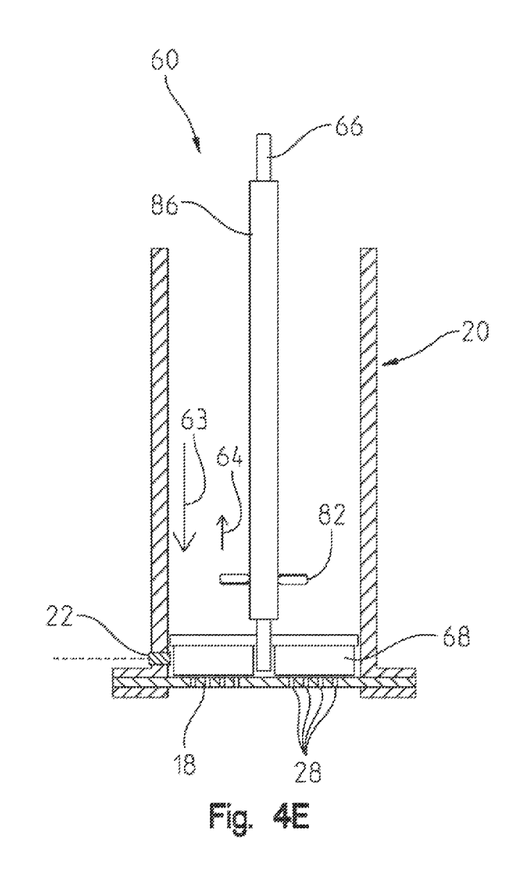
Figure 4F:
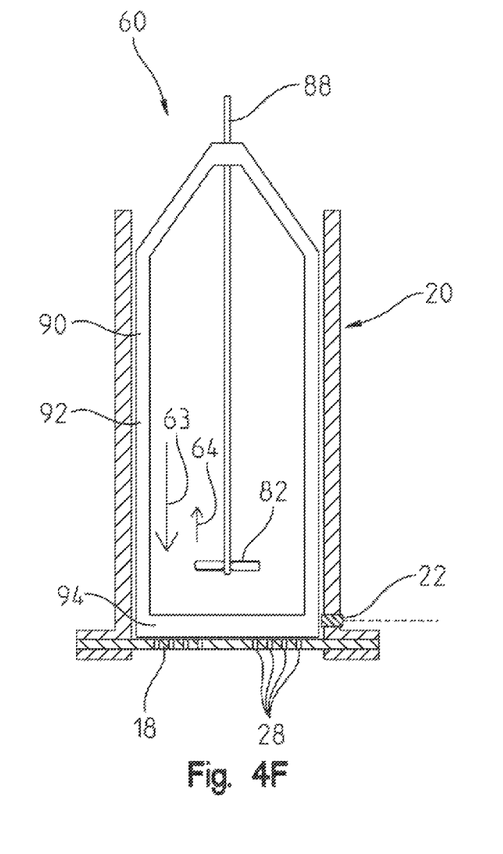

Referring additionally to FIGS. 3-4F, a pressure in prill head 20 can be regulated using an axial flow element that may be used separately from, or concurrently with, the foregoing headspace pressure regulating embodiments.

Referring first to FIG. 3, a sectional view of a prill head 20 containing an exemplary mixing element 60 is illustrated. Prill plate 18 comprising a plurality of prill holes 28 is attached to one end of prill head 20. Walls 62 of prill head surround mixing element 60. Liquid or slurry, such as the ammonium sulfate nitrate described above or other fertilizer composition, for example, enters near the top of prill head 20 and flows in a downflow direction generally indicated by the arrow 63. Mechanical agitation by mixing element 60 introduces shearing forces to the liquid or slurry. Shearing forces may be introduced by blades 68 or scrapers 70 as mixing element 60 is rotated within prill head 20. When the liquid or slurry is shear thinning, such as ammonium sulfate nitrate, the shearing forces reduce the viscosity of the liquid or slurry. The liquid or slurry flows through prill holes 28 in prill plate 18 to form prills.

In one embodiment, prill plate 18 is generally flat. Other suitable shapes for prill plate, including but not limited to generally conical, generally cylindrical, generally frustoconical, or a combination of these shapes may also be used. In one embodiment, walls 62 provide prill head 20 with a generally cylindrical shape, although other suitable shapes, such as conical or frustoconical, may also be used. Although mixing element 60 is moveable and prill head 20 is stationary in the described embodiment, other suitable arrangements, including but not limited to a stationary mixing element 60 and a moveable prill head 20, or arrangements in which both mixing element 60 and prill head 20 are moveable, may also be used.

As previously described, the consistency of the pressure at prill plate 18 can influence the quality and size distribution of prills produced by the prilling process. The pressure at prill plate 18 depends, among other things, on the amount of liquid above prill plate 18 and forces from mixing element 60. In one embodiment, an axial upflow force, in a direction indicated by arrow 64, is introduced to prill head 20 to regulate the pressure at prill plate 18. The axial flow element introduces a flow of the composition in an axial upflow direction 64 away from the surface of prill plate 18. Axial upflow 64 is generally perpendicular to, and oriented in a direction generally away from, the surface of prill plate 18 when prill plate is generally flat, and generally parallel to a central axis of prill plate 18, and oriented in a direction generally away from, a bottom of prill plate 18 when prill plate is generally conical, frustoconical, or cylindrical. Axial upflow 64 is smaller in magnitude than downflow 63, such that an amount of the liquid or slurry continually exits prill head 20 through prill plate 18.

In one embodiment, the axial upflow is introduced to the liquid or slurry by axial upflow elements on mixing element 60. Exemplary mixing elements 60 including axial upflow elements are further illustrated in FIGS. 4A-4F.

In another embodiment, the amount of axial upflow generated can be varied. In one embodiment, a pressure sensor 22 positioned in prill head 20 proximal to prill plate 18 measures the pressure and pressure indicator controller 26 compares the pressure to a predetermined pressure. If the measured pressure is greater than the predetermined pressure, the amount of axial upflow generated is increased. If the measured pressure is less than the predetermined pressure, the amount of axial upflow generated is decreased.

In another embodiment, the prilling process is operated with a first amount of axial upflow for a given rate of liquid or slurry entering the vessel 14 through feed stream 16, a given level 32, a given temperature, and other operating parameters. Characteristics of the prills produced, such as prill quality, uniformity, and size distribution, may then be examined. The prilling process may then be operated with a second amount of axial upflow and the characteristics of the prills produced compared to the characteristics of the prills produced at the first amount of axial upflow. This process may be repeated until an amount of axial upflow is determined that results in acceptable or desired prill characteristics. In still another embodiment, one or more components of prill head 20 or mixing element 60 may be replaced, removed, or adjusted to adjust the amount of axial upflow.

In one embodiment, the amount of axial upflow is adjusted by adjusting the speed of mixing element 60 comprising axial upflow elements. When the speed of mixing element 60 is increased, the amount of axial upflow increases, which decreases the pressure at prill plate 18. A decrease in pressure at prill plate 18 results in smaller prills. When the speed of mixing element 60 is decreased, the amount of axial upflow decreases, which increases the pressure at prill plate 18 An increase in pressure at prill plate 18 results in larger prills. In one embodiment, the pressure indicator controller 26 controls the speed of mixing element 60 based on readings by pressure sensor 22 proximal to prill plate 18. This allows dynamic changes in axial upflow in response to changes in pressure at prill plate 18. Varying the axial upflow in response to pressure changes allows for better consistency in the pressure at prill plate 18. In another embodiment, the speed of axial upflow elements can be controlled independently of the speed of mixing element 60.

In another embodiment, the amount of axial upflow is adjusted by adjusting the pitch of axial upflow elements on mixing element 60. Although other factors may influence the flow dynamics of mixing element 60, generally, when the pitch of axial flow elements departs from a pure horizontal or pure vertical orientation, the amount of axial upflow increases, which decreases the pressure at prill plate 18. A decrease in pressure at prill plate 18 results in smaller prills. Conversely, when the pitch of axial flow elements approaches a pure horizontal or pure vertical orientation, the amount of axial upflow decreases, which increases the pressure at prill plate 18. An increase in pressure at prill plate 18 results in larger prills.

In another embodiment, the amount of axial upflow is adjusted by adjusting the displacement of axial upflow elements relative to prill plate 18. When the distance between axial upflow elements and prill plate 18 increases, the amount of axial upflow increases, which decreases the pressure at prill plate 18. A decrease in pressure at prill plate 18 results in smaller prills. When the distance between axial upflow elements and prill plate 18 decreases, the amount of axial upflow decreases, which increases the pressure at prill plate 18. An increase in pressure at prill plate 18 results in larger prills.

As illustrated in FIG. 4A, in one embodiment, scrapers 70' are formed as ribbons. Rotation of shaft 66 in a clockwise direction when viewed from above causes rotation of the ribbon scrapers 70', introducing flow in an axial upflow direction 64. Exemplary methods of adjusting the amount of axial flow introduced may include, but are not limited to, changing the degree of displacement of ribbon scrapers 70' about shaft 66, changing the rotation speed of shaft 66, and changing the vertical position of ribbon scrapers 70' in relation to the surface of prill plate 18.

As illustrated in FIG. 4B, in another embodiment of mixing element 60, shaft 66, blades 68 and/or scrapers 70 include pitched blades or extensions 82. Rotation of shaft 66 causes rotation of the pitched extensions 82, introducing flow in an axial upflow direction 64. Exemplary methods of adjusting the amount of axial flow introduced may include, but are not limited to, changing the pitch of extensions 82, changing the rotation speed of shaft 66, and changing the vertical position of extensions 82 in relation to the surface of prill plate 18.

As illustrated in FIG. 4C, in another embodiment of mixing element 60 blades 68' are pitched to introduce flow in an axial upflow direction 64. Exemplary methods of adjusting the amount of axial flow introduced may include, but are not limited to, changing the pitch of blades 68', changing the rotation speed of shaft 66, and changing the vertical position of blades 68' in relation to the surface of prill plate 18.

As illustrated in FIG. 4D, in another embodiment of mixing element 60, a ribbon screw 84 is attached to shaft 66 to introduce flow in an axial upflow direction 64. Exemplary methods of adjusting the amount of axial flow introduced may include, but are not limited to, changing the pitch of ribbon screw 84, changing the rotation speed of shaft 66, and changing the vertical position of ribbon screw 84 in relation to the surface of prill plate 18.

As illustrated in FIG. 4E, in another embodiment of mixing element 60, an external shaft 86 is fitted around shaft 66. As illustrated, external shaft 86 includes extensions 82 to introducing flow in an axial upflow direction 64, but other suitable methods of introducing axial flow, including but not limited to ribbon screw 84 may also be used. In one embodiment, external shaft 86 is independently driven with respect to shaft 66. In this embodiment, the rotation of shaft 66 can be regulated based on the amount of shear-thinning agitation desired, while rotation of shaft 86 can be regulated based on the amount of flow in an axial upflow direction 64 desired. In another embodiment, external shaft 86 can be axially displaced relative to shaft 66. In this embodiment, the vertical position of shaft 66 can be regulated based on the amount of shear-thinning forces desired, while the vertical position of shaft 86 can be regulated based on the amount of flow in an axial upflow direction 64 desired.

As illustrated in FIG. 4F, in another embodiment of mixing element 60, a first shaft 88 includes extensions 82 to introducing flow in an axial upflow direction 64, but other suitable methods of introducing axial flow, including but not limited to ribbon screw 84 may also be used. A U-member 90 including scraper region 92 and blade region 94, is positioned around first shaft 88. In one embodiment, first shaft 88 is independently driven compared to U-member 90. In this embodiment, the rotation of U-member 90 can be regulated based on the amount of shear-thinning agitation desired, while rotation of first shaft 88 can be regulated based on the amount of flow in an axial upflow direction 64 desired. In another embodiment, external shaft 86 can be axially displaced relative to shaft 66. In this embodiment, the vertical position of shaft 66 can be regulated based on the amount of shear-thinning agitation desired, while the vertical position of shaft 86 can be regulated based on the amount of flow in an axial upflow direction 64 desired.

Although a variety of method for generating axial flow have been illustrated, the illustrated embodiments are only exemplary. In another embodiment, one or more of blades 68, 68', scrapers 70, ribbon scrapers 70', extensions 82, ribbon screw 84, or other method for introducing axial flow may bend or flex depending on the rotation speed. Other suitable methods for introducing axial flow, including combinations of disclosed methods, may also be used.

In another embodiment, a combination of headspace pressure and an axial flow element may be used to control the pressure.

Example 1

An 8-in diameter prill head of the type shown in FIG. 3 was connected to a pressure control system of the type shown in FIG. 1. Referring to FIG. 3, the prill plate 18 had several prill holes 28 of diameter 0.060 in. An ammonium sulfate nitrate melt slurry consisting of 38 wt. % ground ammonium sulfate and 62 wt. % molten ammonium nitrate was prepared and charged to the prill head 20 at 175° C. With the prill head agitator 60 operating at 360 rpm, air was applied to the headspace through vapor feed 44, generating a pressure at pressure sensor 22 of 2 psi. The slurry flowed through the prill plate holes 28 to form droplets. A steady flow of droplets was obtained and the liquid level in the prill head 20 was controlled at the desired set point value. The average diameter for the droplets produced in this manner was found to be 2.7 mm, as determined by a fiber optic method.

Example 2

Using the same prill head and pressure control system as in Example 1, ammonium sulfate nitrate melt slurry was prilled through a plate having several prill holes of diameter 0.040 in. With the prill head agitator operating at 360 rpm, compressed air was provided to the headspace through vapor feed 44. The pressure in the headspace at pressure sensor 22 was controlled over a range of 2-5 psi. The prill head was operated continuously for 30 minutes with a steady flow of slurry through the prill holes to form droplets. The liquid level in the prill head was controlled at the desired set point value with level sensor 30. The average diameter for the droplets produced in this manner was found to be 2.3 mm, as determined by a fiber optic method.

While the present disclosure is primarily directed to controlling the pressure of a liquid or slurry in a prilling tower, it should be understood that the features disclosed herein may have application to the control of other types of systems.

While this invention has been described as relative to exemplary designs, the present invention may be further modified within the spirit and scope of this disclosure. Further, this application is intended to cover such departures from the present disclosure as come within known or customary practice in the art to which this invention pertains.

What is claimed is:

1. A prilling method, comprising the steps of:
   supplying a liquid or slurry to a vessel, the vessel in fluid communication with a prill plate having a plurality of apertures;
   maintaining a substantially constant volume of the liquid or slurry in the vessel while allowing passage of the liquid or slurry through the prill plate; and
   regulating a pressure of the liquid or slurry at a location proximate the prill plate during said maintaining step.

2. The method of claim 1, wherein the vessel includes a headspace above the volume of the liquid or slurry and said regulating step further comprises the additional steps of:
   supplying a gas or vapor to the vessel at a pressure higher than a predetermined pressure; and
   venting the gas or vapor to substantially maintain the predetermined pressure in the vessel.

3. The method of claim 2, wherein said regulating step further comprises the additional steps of:
   measuring the pressure at a position in the headspace; and
   venting the gas or vapor in response to the measured pressure.

4. The method of claim 2, wherein said regulating step further comprises the additional steps of:
   measuring the pressure at a position in the volume of liquid or slurry; and
   venting the gas or vapor in response to from the vessel in response to the measured pressure.

5. The method of claim 2 wherein said regulating step further includes providing an axial upflow to the liquid or slurry.

6. The method of claim 1 further comprising the additional step of comprising shear-thinning the liquid or slurry.

7. The method of claim 1 wherein said regulating step further includes providing an axial upflow to the liquid or slurry.

8. The method of claim 7 wherein the axial upflow is provided by an axial flow element on a rotating mixing element.

9. The method of claim 7 wherein said regulating step further comprises the additional steps of:
   monitoring a characteristic of prills produced by the passage of the liquid or slurry through the prill plate; and
   adjusting an amount of the axial upflow in response to the characteristic of prills.

10. The method of claim 7 further comprising the additional step of shear-thinning the liquid or slurry.

11. A prilling device for use in prilling a liquid or slurry, said prilling device comprising:
    a vessel in fluid communication with a prill plate having a plurality of apertures;
    a fluid inlet; and
    a pressure regulator for regulating a pressure of the liquid or slurry proximate the prill plate.

12. The prilling device of claim 11, wherein said vessel includes a headspace above a level of liquid or slurry in said vessel, and said pressure regulator comprises:
    a gas or vapor inlet providing a gas or vapor to the vessel;
    a vent for removing a gas or vapor from the vessel; and
    a control valve controlling the flow of the gas or vapor through the vent based on a pressure inside the vessel.

13. The prilling device of claim 12 further comprising:
    a pressure sensor in communication with the headspace and measuring a pressure in the headspace;
    wherein the control valve controls the flow of gas or vapor through the vent based on the pressure measured by the pressure sensor.

14. The prilling device of claim 12 further comprising:
    a pressure sensor in communication with the liquid or slurry and measuring a pressure of the liquid or slurry;
    wherein the control valve controls the flow of gas or vapor through the vent based on the pressure measured by the pressure sensor.

15. The prilling device of claim 11, wherein the pressure regulator comprises an axial upflow element operable to induce axial upflow of liquid or slurry contained inside the vessel.

16. The prilling device of claim 11, further comprising:
    a mechanical agitator positioned in the vessel configured to introduce shearing forces to the liquid or slurry.

17. The prilling device of claim 16, wherein the pressure regulator comprises an axial upflow element operable to induce axial upflow of liquid or slurry contained inside the vessel.

18. The prilling device of claim 17, wherein said axial upflow element is positioned on the mechanical agitator.

19. The prilling device of claim 11, further comprising a substantially consistent quantity of the liquid or slurry in the vessel.

* * * * *